United States Patent
Chuang et al.

(10) Patent No.: US 11,005,252 B2
(45) Date of Patent: May 11, 2021

(54) PROTECTION CIRCUIT APPLIED TO ELECTRONIC DEVICE AND ASSOCIATED PROTECTION METHOD

(71) Applicant: MEDIATEK INC., Hsin-Chu (TW)

(72) Inventors: Tsui-Chuan Chuang, Hsinchu (TW); Ming-Ruei Liu, Hsinchu (TW); Dien-Shen Chiang, Hsinchu (TW); Chien-Tai Kao, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 92 days.

(21) Appl. No.: 16/401,352

(22) Filed: May 2, 2019

(65) Prior Publication Data
US 2019/0341765 A1 Nov. 7, 2019

(30) Foreign Application Priority Data
May 2, 2018 (TW) .................................. 107114870

(51) Int. Cl.
*H02H 3/04* (2006.01)
*H02H 3/20* (2006.01)
*G06F 1/28* (2006.01)

(52) U.S. Cl.
CPC .............. *H02H 3/048* (2013.01); *G06F 1/28* (2013.01); *H02H 3/20* (2013.01)

(58) Field of Classification Search
CPC ............. H02H 3/048; H02H 3/20; G06F 1/28
See application file for complete search history.

(56) References Cited

U.S. PATENT DOCUMENTS

| | | | | |
|---|---|---|---|---|
| 4,492,876 A | * | 1/1985 | Colbert | H02J 9/061 307/66 |
| 5,608,273 A | * | 3/1997 | Bartlett | H02J 9/061 307/64 |
| 6,452,362 B1 | * | 9/2002 | Choo | H02J 7/0025 320/116 |
| 6,744,151 B2 | * | 6/2004 | Jackson | H02J 1/001 307/43 |
| 7,282,899 B1 | * | 10/2007 | Daun-Lindberg | H02J 1/001 323/272 |

(Continued)

FOREIGN PATENT DOCUMENTS

| | | |
|---|---|---|
| TW | 201347349 A | 11/2013 |
| TW | I548176 B | 9/2016 |

(Continued)

*Primary Examiner* — Yusef A Ahmed
(74) *Attorney, Agent, or Firm* — McClure, Qualey & Rodack, LLP

(57) ABSTRACT

A protection circuit for an electronic device including a first power output interface and a second power output interface is disclosed. The protection circuit includes a first switch element and a detection circuit. The first switch element is coupled between a first voltage source and the first power output interface. In an operation of the protection circuit, the detection circuit detects an output voltage value of the second power output interface to generate a detection result, and the first switch element, according to the detection result, connects the first voltage source to the first power output interface to allow the first power output interface to output power to an external terminal, or disconnects the first voltage source from the first power output interface.

16 Claims, 4 Drawing Sheets

(56) References Cited

U.S. PATENT DOCUMENTS

| | | | |
|---|---|---|---|
| 8,330,294 B2* | 12/2012 | Nishigata | G06F 1/263 |
| | | | 307/52 |
| 9,294,830 B2 | 3/2016 | Terlizzi | |
| 9,478,975 B2* | 10/2016 | Lin | H02H 9/04 |
| 9,729,145 B2* | 8/2017 | Sbuell | G06F 1/263 |
| 9,811,062 B2* | 11/2017 | Akebono | H03K 17/223 |
| 9,871,524 B2* | 1/2018 | Kim | H03K 19/01859 |
| 2005/0062459 A1* | 3/2005 | Young | H02J 7/0029 |
| | | | 320/134 |
| 2009/0110215 A1* | 4/2009 | Liu | H04M 1/60 |
| | | | 381/109 |
| 2010/0225169 A1* | 9/2010 | Hanawa | H03K 17/302 |
| | | | 307/43 |
| 2012/0032726 A1* | 2/2012 | Nishigata | G06F 1/263 |
| | | | 327/407 |
| 2012/0212063 A1 | 8/2012 | Terlizzi | |
| 2012/0300353 A1* | 11/2012 | Chien | H02H 5/042 |
| | | | 361/103 |
| 2013/0272691 A1* | 10/2013 | Yamaguchi | G05F 3/08 |
| | | | 396/301 |
| 2014/0085756 A1* | 3/2014 | Lin | H02H 3/021 |
| | | | 361/18 |
| 2015/0005976 A1* | 1/2015 | Akebono | G05B 15/02 |
| | | | 700/297 |
| 2016/0116957 A1* | 4/2016 | Chen | G06F 1/263 |
| | | | 713/340 |
| 2016/0190794 A1* | 6/2016 | Forghani-Zadeh | H02H 9/048 |
| | | | 361/86 |
| 2016/0308527 A1* | 10/2016 | Kim | H03K 19/018592 |
| 2016/0365805 A1* | 12/2016 | Guo | G06F 1/26 |
| 2017/0060215 A1* | 3/2017 | Yanagawa | G06F 1/3284 |
| 2018/0052432 A1* | 2/2018 | Kim | G06F 1/263 |
| 2018/0067885 A1 | 3/2018 | Hsieh et al. | |
| 2019/0319545 A1* | 10/2019 | Wang | G06F 1/28 |
| 2020/0274373 A1* | 8/2020 | Wang | G01R 31/50 |

FOREIGN PATENT DOCUMENTS

| | | |
|---|---|---|
| TW | 201701563 A | 1/2017 |
| TW | 201812603 A | 4/2018 |

* cited by examiner

… … …

PROTECTION CIRCUIT APPLIED TO ELECTRONIC DEVICE AND ASSOCIATED PROTECTION METHOD

This application claims the benefit of Taiwan application Serial No. 107114870, filed May 2, 2018, the subject matter of which is incorporated herein by reference.

BACKGROUND OF THE INVENTION

Field of the Invention

The invention relates to an electronic device having multiple power output interfaces.

Description of the Related Art

In Universal Serial Bus (USB) type-C compliant specifications, many power supply specifications having different output powers are defined to allow an electronic device to have a higher power output efficiency. However, the power supply of a common electronic device is limited. Thus, if an electronic device concurrently charges two or more mobile devices and one of the mobile devices uses a power supply specification having a high power output, the power consumption of the electronic device can be overly large, causing system abnormality or damage.

SUMMARY OF THE INVENTION

Therefore, it is an object of the present invention to provide a protection circuit capable of quickly shutting down one of multiple power outputs in the possibility of an overly large power consumption, so as to prevent system abnormality or damage.

A protection circuit for an electronic device is disclosed according to an embodiment of the present invention. The electronic device includes a first power output interface and a second power output interface. The protection circuit includes a first switch element and a detection circuit. The first switch element is coupled between a first voltage source and the first power output interface. In an operation of the protection circuit, the detection circuit detects an output voltage value of the second output interface to generate a detection result, and the first switch element, according to the detection result, connects the first voltage source to the first power output interface to allow the first power output interface to output power to an external terminal, or disconnects the first voltage source from the first power output interface.

A protection method for an electronic device is disclosed according to another embodiment of the present invention. The electronic device includes a first power output interface and a second power output interface. The protection method includes: detecting an output voltage value of the second power output interface to generate a detection result; and according to the detection result, connecting the first voltage source to the first power output interface to allow the first power output interface to output power to an external terminal, or disconnecting the first voltage source from the first power output interface.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 1:
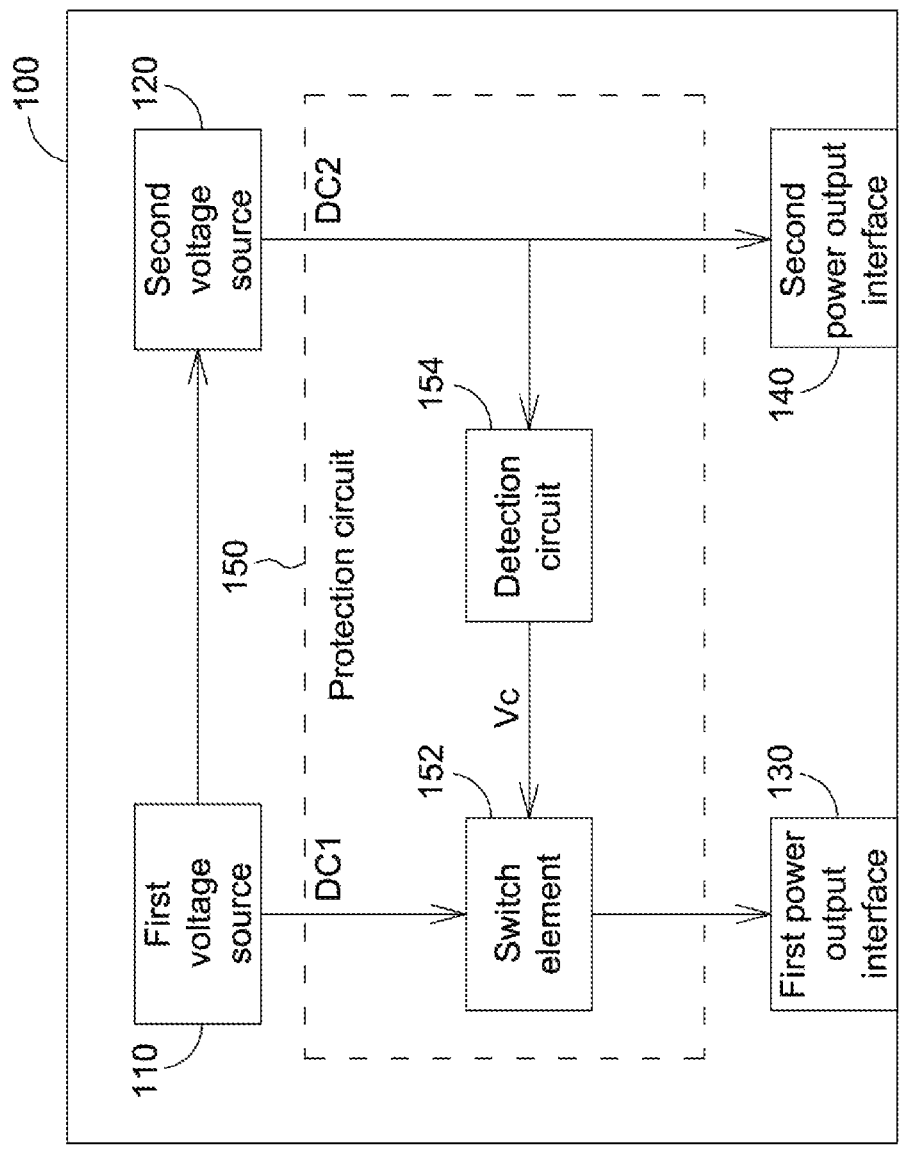
FIG. 1 is a block diagram of an electronic device according to an embodiment of the present invention.

FIG. 1 shows a block diagram of an electronic device 100 according to an embodiment of the present invention. As shown in FIG. 1, the electronic device 100 includes a first voltage source 110, a second voltage source 120, a first power output interface 130, a second power output interface 140, and a protection circuit 150. The protection circuit 150 includes a switch element 152 and a detection circuit 154. In this embodiment, the electronic device 100 may be a display device or any other electronic device capable of charging another device, the first power output interface 130 is a data transmission connector capable of outputting a fixed power/voltage value, and the second power output interface 140 has multiple power supply specifications with different output power/voltage values. For example, the second power output interface 140 supports the Universal Serial Bus (USB) type-C specifications.

In the embodiment in FIG. 1, the first voltage source 110 generates a first supply voltage DC1 to the first power output interface 130, enabling the first power output interface 130 to charge a connected device. Further, the second voltage source 120 generates a second supply voltage DC2 to the second power output interface 140, enabling the second power output interface 140 to charge a connected device. In this embodiment, the first supply voltage DC1 provided by the first voltage source 110 is a fixed voltage value, and the second voltage source 120 generates, according to the first supply voltage DC1, the second supply voltage DC2 that can be changed based on negotiation between devices. However, the present invention is not limited to the above example. In other embodiments, the second voltage source 120 can generate the second supply voltage DC2 according to other voltage values.

The output voltage value of the second power output interface 140 (i.e., the second supply voltage DC2 provided by the second voltage source 120) is not always a constant value. Thus, to avoid an overly high overall power consumption of the electronic device 100, the protection circuit 150 is provided in this embodiment to forcibly turn off the switch element 152 when the second supply voltage DC2 is too high to disconnect the first voltage source 110 from the first power output interface 130, so as to prevent system abnormality or damage. More specifically, the detection circuit 154 can detect the level of the second supply voltage DC2 to generate a detection result Vc, and the switch element 152 then determines according to the detection result Vc whether to connect the first voltage source 110 to the first power output interface 130. For example, when the detection result Vc indicates that the second supply voltage DC2 is higher than a threshold, the switch element 152 disconnects the first voltage source 110 from the first power output interface 130, so as to prevent the first power output interface 130 from charging an external device and thus avoiding an overly high overall power consumption of the electronic device 100. When the detection result Vc indicates that the second supply voltage DC2 is not higher than the threshold, the switch element 152 connects the first voltage source 110 to the first power output interface 130, allowing the first power output interface 130 to charge an external device.

An example is given below for further illustration. In the description below, it is assumed that the maximum output power of the first voltage source 110 is 145 W, the output power of the first power output interface 130 when an external device is plugged to the first power output interface 130 is 60 W, the electronic device 100 has a fixed power consumption of 70 W (e.g., for a panel, audio and other fundamental operations), and the power supply specifications supported by the second power output interface 140 include 5V/3 A, 9V/3 A, 10V/5 A, 12V/5 A, and 20V/3.25 A, where "V" denotes volt and "A" denotes ampere. In this example, while the first power output interface 130 charges an external device, the power output permitted through the second power output interface 140 is only 15 W (145−70−60=15), and hence the second power output interface 140 in the above conditions can only output 5V/3 A (i.e., 15 W). If the second power output interface 140 at this point outputs 9V/3 A, 10/5V, 12V/5 A or 20V/3.25 A, the power supply capability of the first voltage source 110 can be exceeded, leading to system abnormality or damage. Thus, if the detection result Vc generated by the detection 154 indicates that the level of the second supply voltage DC2 is higher than 5V, the switch element 152 disconnects the first voltage source 110 from the first power output interface 130, so as to prevent the first power output interface 130 from charging the external device. If the detection result Vc generated by the detection circuit 154 indicates that the level of the second supply voltage DC2 is not higher than 5V, the switch element 152 connects the first voltage source 110 to the first power output interface 130 to allow the first power output interface 130 to charge the external device. It should be noted that, the above example merely serves illustration purposes; in practice, the threshold corresponding to the second supply voltage DC2 can be adjusted according to the system power consumption of the electronic device 100.

Figure 2:
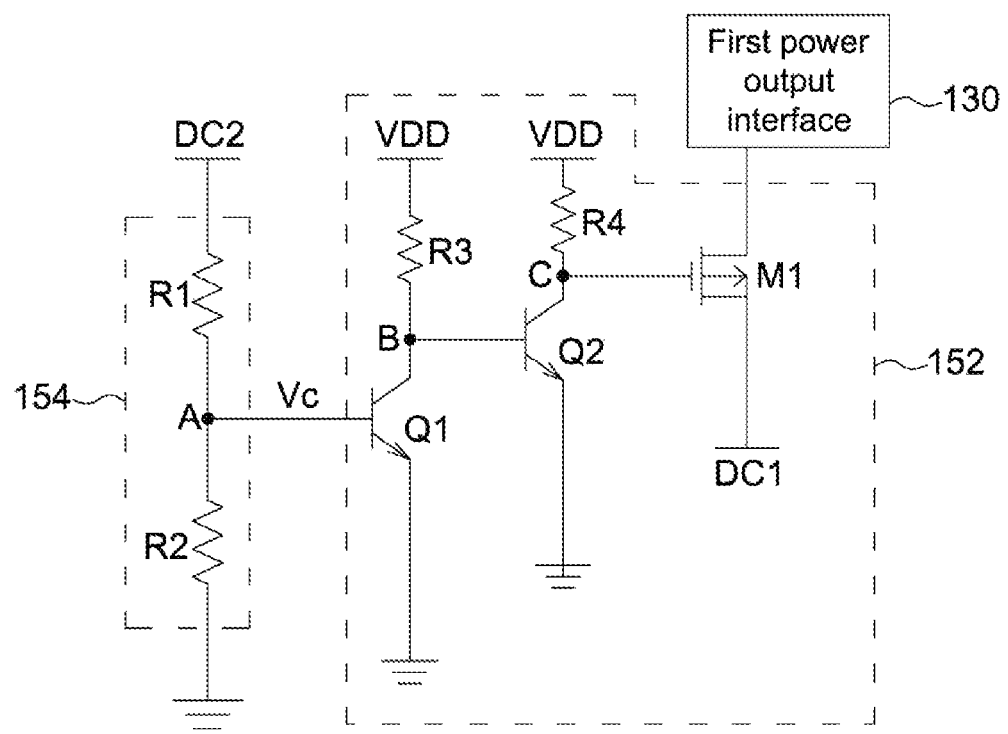
FIG. 2 is a schematic diagram of a detection circuit and a switch element according to an embodiment of the present invention.

To enable the protection circuit 150 to quickly and efficiently reflect the level of the second supply voltage DC2 to protect the system, the detection circuit 154 and the switch element 152 included in the protection circuit 150 are entirely implemented by hardware and do not involve any software control. For example, FIG. 2 shows a schematic diagram of the detection circuit 154 and the switch element 152 according to an embodiment of the present invention. The detection circuit 154 includes a voltage dividing circuit consisting of resistors R1 and R2. The switch element 152 includes a logic circuit consisting of transistors Q1 and Q2 connected to a reference voltage VDD and a ground voltage as well as resistors R3 and R3, and a P-type metal-oxide semiconductor field-effect transistor (MOSFET) M1. In the operation of the detection circuit 154 and the switch circuit 152, the voltage dividing circuit consisting of the resistors R1 and R2 divides the voltage of the second supply voltage DC2 to generate a voltage divided signal. In this embodiment, the voltage divided signal is the detection result Vc generated by the detection circuit 154; the logic circuit consisting of the transistors Q1 and Q2 as well as the resistors R3 and R3 controls the turning on/off of the P-type MOSFET M1 according to the detection result Vc, so as to selectively connect the first supply voltage DC1 to the first power output interface 130. More specifically, with appropriate resistance values designed for the resistors R1 to R4, when a node A is at a high voltage level (which equivalently means that the level of the second supply voltage DC2 is higher than the threshold), a node B becomes at a low voltage level and a node C becomes at a high voltage level, such that the P-type MOSFET M1 is turned off and the first voltage source 110 is disconnected from the first power output interface 130. Conversely, when the node A is at a low voltage level, the node B becomes at a high voltage level and the node C becomes at a low voltage level, such that the P-type MOSFET M1 is turned on and the first voltage source 110 is connected to the first power output interface 130.

It should be noted that, the circuit structure shown in FIG. 2 is merely an example for illustrations and is not to be construed as a limitation to the present invention. In other embodiments of the present invention, the logic circuit included in the switch element 152 may have a different structure (e.g., a larger or smaller number of transistors), or the P-type MOSFET M1 can be replaced by an N-type MOSFT. Given that the detection circuit 154 and the switch element 152 can disconnect the first voltage source 110 from the first power output interface 130 when the level of the second supply voltage DC is higher than a threshold, design variations of associated circuits are to be encompassed within the scope of the present invention.

Figure 3:
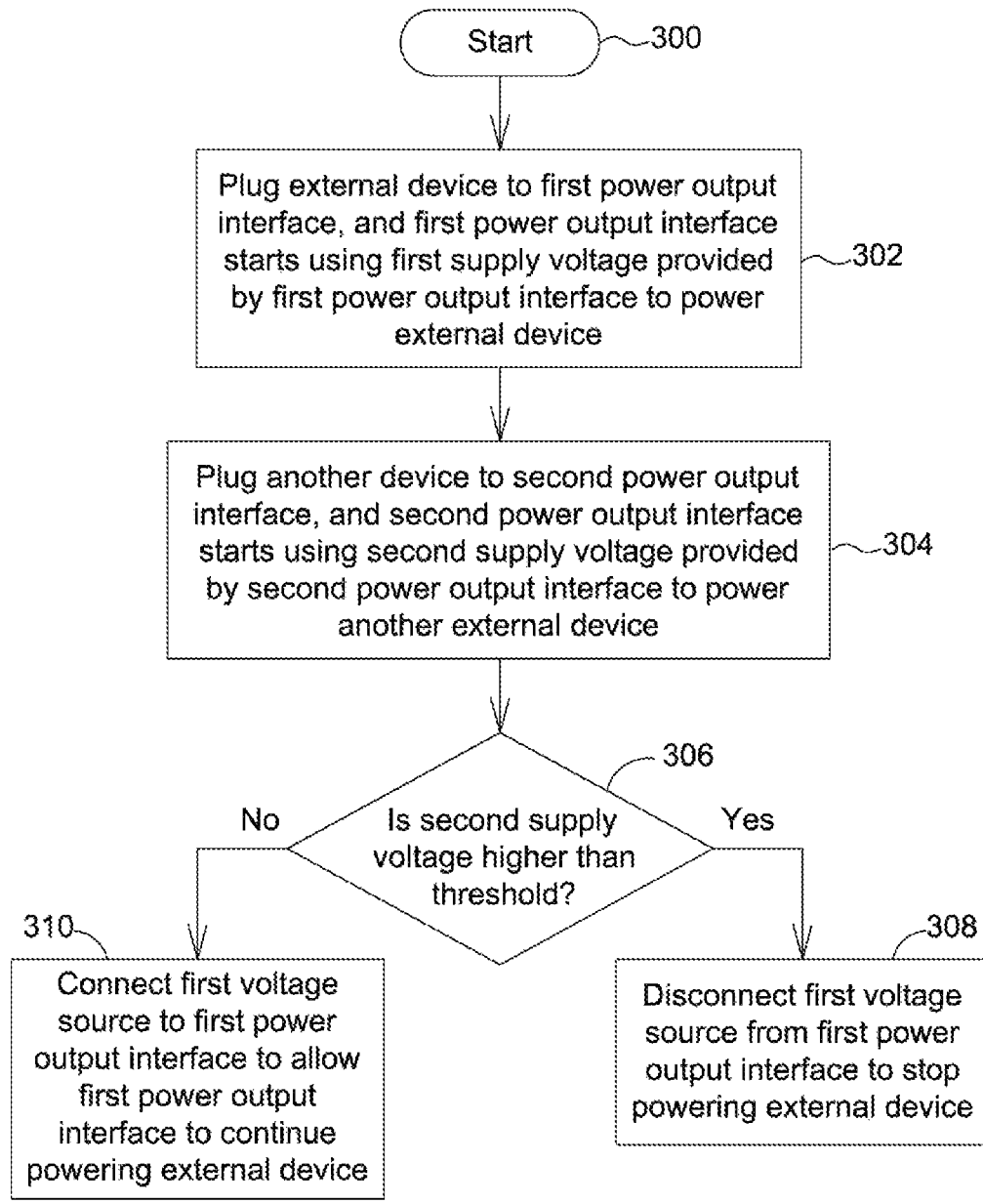
FIG. 3 is a flowchart of a protection method for an electronic device according to an embodiment of the present invention.

FIG. 3 shows a flowchart of a protection method for an electronic device according to an embodiment of the present invention. Referring to the disclosure above, the process of the protection method of this embodiment is as below.

In step 300, the process begins.

In step 302, a user plugs an external device to the first power output interface, and the first power output interface 130 starts to use the first supply voltage DC1 provided by the first voltage source 110 to power the external device.

In step 304, the user plugs another external device to the second power output interface 140, and the second power output interface 140 starts to use the second supply voltage DC2 provided by the second voltage source 120 to power the another external device.

In step 306, the protection circuit 150 determines whether the second supply voltage DC2 is higher than a threshold; the process enters step 308 if so, otherwise the process enters step 310.

In step 308, the protection circuit 150 disconnects the first voltage source 110 from the first power output interface 130 to stop powering the external device.

In step 310, the protection circuit 150 continues connecting the first voltage source 110 to the first power output interface 130 to allow the first power output interface 130 to continue powering the external device.

Figure 4:
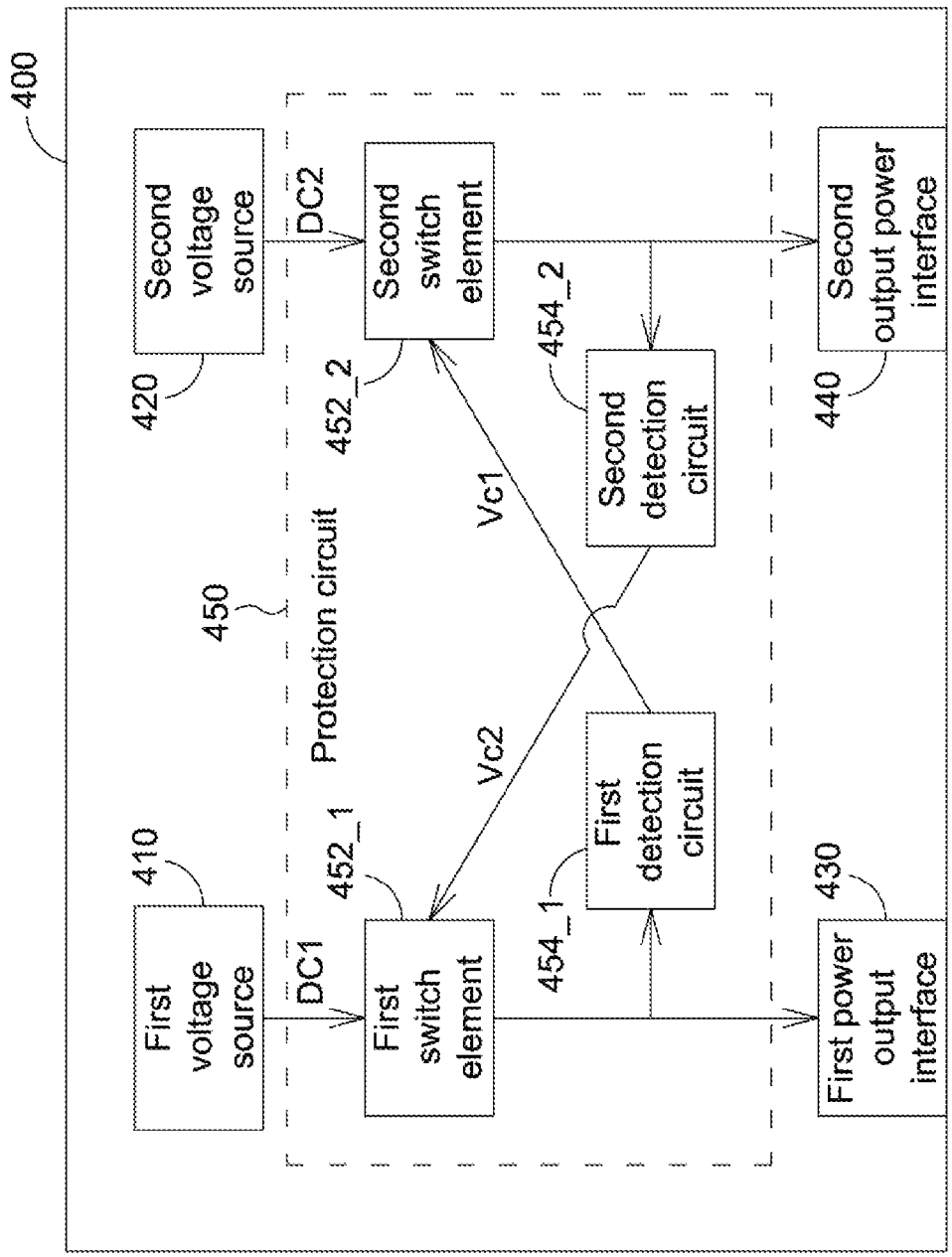
FIG. 4 is a block diagram of an electronic device according to another embodiment of the present invention.

FIG. 4 shows a block diagram of an electronic device 400 according to another embodiment of the present invention. As shown in FIG. 4, the electronic device 400 includes a first voltage source 410, a second voltage source 420, a first power output interface 430, a second power output interface 440, and a protection circuit 450. The protection circuit 450 includes a first switch element 452_1 and a second switch element 452_2, and a first detection circuit 454_1 and a second detection circuit 454_2. In this embodiment, the electronic device 400 may be a display device or any other electronic device capable of charging another device, the first power output interface 430 and the second power output interface 440 have many power supply specifications with different output/voltage values. For example, the first power output interface 430 and the second power output interface 440 support the USB type-C specifications.

In the embodiment in FIG. 4, the first voltage source 410 generates a first supply voltage DC1 to the first power output interface 430, enabling the first power output interface 430 to charge a connected device. Further, the second voltage source 430 generates a second supply power DC2 to the second power output interface 440, enabling the second power output interface 440 to charge a connected device.

As stated, the first power output interface 430 and the second power output interface 440 have many power supply specifications with different output power/voltage values. Thus, to avoid an overly high overall power consumption of the electronic device 400, in this embodiment, the protection circuit 450 is provided to forcibly turn off the switch element 452_1 when the second supply voltage DC2 gets too high to disconnect the first power source 410 from the first power output interface 430, and forcibly turn off the switch element 452_2 when the first supply power DC1 gets too high to disconnect the second voltage source 420 from the second power output interface 440, so as to prevent system abnormality or damage. More specifically, the first detection circuit 454_1 can detect the level of the first supply voltage DC1 to generate a detection result Vc1, and the second switch element 452_2 determines according to the detection result Vc1 whether to connect the second voltage source 420 to the second power output interface 440. For example, when the detection result Vc1 indicates that the first supply voltage DC1 is higher than a threshold, the second switch element 452_2 disconnects the second voltage source 420 from the second power output interface 440, so as to prevent the second power output interface 440 from charging an external device and thus avoiding an overly large overall power consumption of the electronic device 400. When the detection result Vc1 indicates that the first supply voltage DC1 is not higher than the threshold, the second switch element 452_2 connects the second voltage source 420 to the second power output interface 440, allowing the second power output interface 440 to charge an external device. Further, the second detection circuit 454_2 can detect the level of the second supply voltage DC2 to generate a detection result Vc2, and the first switch element 452_1 then determines according to the detection result Vc2 whether to connect the first voltage source 410 to the first power output interface 430. For example, when the detection result Vc2 indicates that the second supply voltage DC2 is higher than a threshold, the first switch 452_1 disconnects the first voltage source 410 from the first power output interface 430, so as to prevent the first power output interface 452_1 from charging an external device and thus avoiding an overly high overall power consumption of the electronic device 400. When the detection result Vc2 indicates that the second supply voltage DC2 is not higher than the threshold, the first switch 452_1 connects the first voltage source 410 to the first power output interface 430, allowing the first power output interface 430 to charge an external device.

An example is given below for further illustration. In the description below, it is assumed that the maximum output power of the electronic device 400 is 145 W, the electronic device 400 has a fixed power consumption of 70 W (e.g., for a panel, audio and other fundamental operations), the power supply specifications supported by the first power output interface 430 and the second power output interface 440 include 5V/3 A, 9V/3 A, 10V/5 A, 12V/5 A, and 20V/3.25 A. In this example, when one of the first power output interface 430 and the second power output interface 440 adopts 20V/3.25V (65 W) to charge an external device, only 10 W (145−70−65=10) remains from the allowed power output, and the power supply capability of the electronic device 400 is inevitably exceeded regardless of which power supply specification the other power output interface chooses, leading to system abnormality or damage. Thus, if the detection results Vc1 and Vc2 indicate that the level of any between the first supply voltage DC1 and the second supply voltage DC2 is higher than or equal to 20V, the other power output interface is turned off to prevent system damage. For example, assuming that the first detection circuit 454_1 detects that the level of the first supply voltage DC1 is higher than or equal to 20V, the second switch 452_2 disconnects the second voltage source 420 from the second power output interface 440. It should be noted that, the above example serves merely illustration purposes; in practice, the threshold corresponding to the first supply voltage DC1 and/or the second supply voltage DC2 can be adjusted according to the system power consumption of the electronic device 400.

Further, to enable the protection circuit 450 to quickly and efficiently reflect the levels of the first supply voltage DC1 and the second supply voltage DC2 to protect the system, components included in the protection circuit 450 are entirely implemented by hardware and do not involve any software control. A person skilled in the art can arrive at the details for implementing the protection circuit 450 through modifications on the embodiment in FIG. 2, and such repeated details are omitted herein.

In conclusion of the present invention, in the protection circuit applied to an electronic device of the present invention, one of multiple power outputs can be turned off in the possibility of an overly large system power consumption, so as to prevent system abnormality or damage. Further, the protection circuit is entirely implemented by hardware in orders to quickly and efficiently protect the electronic device.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded with the broadest interpretation so as to encompass all such modifications and similar arrangements and procedures.

What is claimed is:

1. A protection circuit, applied to an electronic device comprising a first power output interface and a second power output interface, the protection circuit comprising:
 a first switch element, coupled between a first voltage source and the first power output interface;
 a second switch element, coupled between a second voltage source and the second power output interface;
 a first detection circuit, detecting an output voltage value of the first power output interface to generate a first detection result; and
 a second detection circuit, detecting an output voltage value of the second power output interface to generate a second detection result,
 wherein, the second switch element, according to the first detection result, connects the second voltage source to the second power output interface to allow the second power output interface to output power to an external terminal, or disconnects the second voltage source from the second power output interface; and
 wherein, the first switch element, according to the second detection result, connects the first voltage source to the first power output interface to allow the first power output interface to output power to the external terminal, or disconnects the first voltage source from the first power output interface.

2. The protection circuit according to claim 1, wherein the second power output interface has multiple power supply specifications with different output voltage values.

3. The protection circuit according to claim 2, wherein the second power output interface complies with a Universal Serial Bus (USB) type-C specification.

4. The protection circuit according to claim 1, wherein when the second detection result indicates that the output voltage value of the second power output interface is higher than a threshold, the first switch element disconnects the first voltage source from the first power output interface; when the second detection result indicates that the output voltage value of the second power output interface is not higher than the threshold, the first switch connects the first voltage source to the first power output interface.

5. The protection circuit according to claim 1, wherein the second detection circuit comprises a voltage dividing circuit that performs voltage dividing on the output voltage value of the second power output interface to generate a voltage divided signal, and the second detection result is generated according to the voltage divided signal.

6. The protection circuit according to claim 5, wherein the voltage divided signal is directly used as the second detection result, and the first switch element determines, directly according to a level of the voltage divided signal, whether to connect the first voltage source to the first power output interface or disconnect the first voltage source from the first power output interface.

7. The protection circuit according to claim 1, wherein the first power output interface and the second power output interface have multiple power supply specifications with different output values.

8. The protection circuit according to claim 7, wherein at least one of the first power output interface and the second power output interface complies with a Universal Serial Bus (USB) type-C specification.

9. A protection method for an electronic device, the electronic device comprising a first power output interface and a second power output interface, the protection method comprising:
  detecting an output voltage value of the first power output interface to generate a first detection result;
  detecting an output voltage value of the second power output interface to generate a second detection result;
  according to the first detection result, connecting a second voltage source to the second power output interface to allow the second power output interface to output power to an external terminal, or disconnecting the second voltage source from the second power output interface; and
  according to the second detection result, connecting a first voltage source to the first power output interface to allow the first power output interface to output power to the external terminal, or disconnecting the first voltage source from the first power output interface.

10. The protection method according to claim 9, wherein the second power output interface has multiple power supply specifications with different output voltage values.

11. The protection method according to claim 10, wherein the second power output interface complies with a Universal Serial Bus (USB) type-C specification.

12. The protection method according to claim 9, wherein the step of, according to the second detection result, connecting the first voltage source to the first power output interface to allow the first power output interface to output power to the external terminal, or disconnecting the first voltage source from the first power output interface comprises:
  when the second detection result indicates that the output voltage value of the second power output interface is higher than a threshold, disconnecting the first voltage source from the first power output interface; and
  when the second detection result indicates that the output voltage value of the second power output interface is not higher than the threshold, connecting the first voltage source to the first power output interface.

13. The protection method according to claim 9, wherein the step of detecting the output voltage value of the second power output interface to generate the second detection result comprises:
  performing voltage dividing on the output voltage value of the second power output interface by a voltage dividing circuit to generate a voltage divided signal; and
  generating the second detection result according to the voltage divided signal.

14. The protection method according to claim 13, wherein the voltage divided signal is directly used as the second detection result, and the step of, according to the second detection result, connecting the first voltage source to the first power output interface to allow the first power output interface to output power to the external terminal, or disconnecting the first voltage source from the first power output interface comprises:
  determining, directly according to a level of the voltage divided signal, whether to connect the first voltage source to the first power output interface or disconnect the first voltage source from the first power output interface.

15. The protection method according to claim 9, wherein the first power output interface and the second power output interface have multiple power supply specifications with different output values.

16. The protection method according to claim 15, wherein at least one of the first power output interface and the second power output interface complies with a Universal Serial Bus (USB) type-C specification.

* * * * *